Nov. 11, 1969 E. WALDELIUS 3,478,165

BALANCING NETWORK FOR LOADED LINE

Filed Sept. 6, 1967

INVENTOR
ERIC WALDELIUS
Hane and Baxley
ATTORNEYS

United States Patent Office 3,478,165

Patented Nov. 11, 1969

3,478,165

BALANCING NETWORK FOR LOADED LINE

Eric Waldelius, Bromma, Sweden, assignor to Telefonaktiebolaget LM Ericsson, Stockholm, Sweden, a corporation of Sweden Filed Sept. 6, 1967, Ser. No. 665,905
Int. Cl. H01b *11/14, 11/16*
U.S. Cl. 178—45 2 Claims

ABSTRACT OF THE DISCLOSURE

A balancing network is provided for a loaded line having a plurality of loaded line sections with a distributed capacitance C and a loading coil with inductance L. The balancing network comprises a series impedance consisting of an inductor and a capacitor connected in parallel, and a shunt capacitor connected to one side of the series impedance. The values of the elements are chosen according to formulae which are dependent on the distributed capacitances of the line sections adjacent to the balancing network.

This invention refers to a balancing network, dimensioned in a certain way, especially for loaded lines.

In earlier methods for the dimensioning of balancing networks one has been obliged to obtain *all* the values of the shunt capacitances of the loaded line sections included in the network. Then the average capacitance of the whole network is arrived at by adding all the values obtained and dividing their sum by the number of whole loaded line sections. The average value thus obtained has been utilized when dimensioning the balancing network.

This procedure is, among other things, made difficult by the fact that the whole line first must be laid out and not until then is it possible to dimension the balancing network. The procedure is also in other respects time-consuming and in many cases the result gives too great a margin of error.

An object of the present invention is to eliminate the above mentioned disadvantages by dimensioning the balancing network on the basis of the capacitance values of only a number of adjacent loaded line sections. These values are combined in the way indicated in the characterizing part of the following claims in consequence of which due consideration is paid to the attenuation and the phase shift of the loaded line sections.

Figure 1:
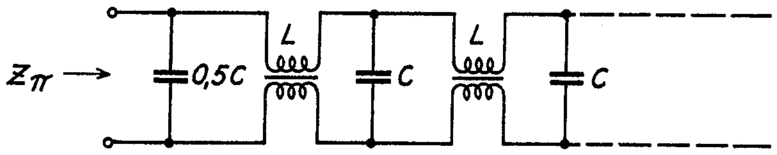
Figure 2:
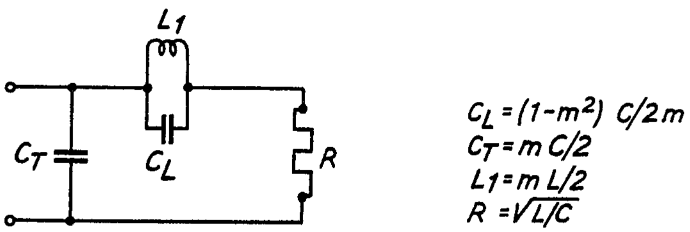

The balancing network according to the invention, applied on a loaded line, will now be more particularly described with reference to the accompanying drawing in which FIG. 1 shows a loaded line, FIG. 2 shows the so-called Hoyt-balance and FIG. 3 a loaded line with variations in the shunt capacitance.

In FIG. 1 there is shown diagrammatically a loaded line, i.e. a symmetrical line in which at regular distances inductance coils L have been connected, each with the inductance L henry, in order to decrease within a limited frequency range, generally comprising the voice frequency range, the attenuation and the attenuation distortion substantially dependent on line resistance and line capacitance. The shunt capacitance of the line is assumed to be C farads per loaded line section. The self-inductance of the line and the shunt capacitance of the loaded line coils will be disregarded (certain regard to this can be paid at the dimensioning of the balancing network by correcting in a particular way the output values L and C) as well as the series resistance and the shunt inductance of the line and the losses, leakage and stray capacitances of the loaded line coils.

Under these conditions, the input admittance of the line when the termination is undisturbed by reflections will be:

$$1/Z_{\pi}=\sqrt{1-(f/f_1)^2}/Z_0$$

where $Z_0=\sqrt{L/C}$
$f$=the frequency
and $f_1$=the limit frequency$=1/\pi\sqrt{LC}$ In the pass band the admittance is real and is indicated in an admittance-frequency diagram as a quarter of an ellipse having one half-axis$=1/Z_0$ and the other$=f_1$. Thus the input impedance of the line is comparatively strongly frequency dependent.

When inserting amplification in two-wire loaded lines the speech directions are usually separated by means of a bifurcation of some kind, usually a differential transformer, so that conventional electronic amplifiers can be used (these can be used in a frequency or time division multiplex system for common utilization of the line or exchange equipment). In order to prevent feed back with the accompanying risk of self-excitations and disturbing echoes in the four-wire part of the transmission system in which the speech directions are separated, a balancing network must be connected to the bifurcation. The impedance of this balancing network coincides as near as possible with the impedance of the two-wire line.

In FIG. 2 is shown diagrammatically the usual configuration and dimensioning of this network, the so-called Hoyt-balance. This consists of a capacitor $C_T$ in shunt with a series connection of an oscillating circuit, having an inductance $L_1$ and a capacitance $C_L$, and of a resistance R. The components included in the balance are dimensioned according to the following:

$$C_L=(1-m^2)C/2m$$
$$C_T=m\cdot C/2$$
$$L_1=m\cdot L/2$$
$$R=m\sqrt{L/C}$$

where C and L refer to FIG. 1 and $m$ is described more particularly later on.

It is presupposed that the loaded line is arranged according to FIG. 1, i.e. the frequency dependence of the impedance is not impedance corrected by special measures. Those parts of the balancing network which are used to simulate frequency dependence of the line impedance, substantially dependent on the line resistance, at lower temperatures, are not shown. In the most simple cases they consist of a series capacitor.

The Hoyt-balance is based on the principle indicated by Zobel for the $m$-derivation of filters, in this case low pass filters. For the best line balancing in the pass band usually $m=0.6$ is selected. Thus the reflection attenuation of the lowest frequency in the pass band up to about 85% of the limit frequency will theoretically be about 34 db (higher frequencies are usually filtered out with the insertion of amplification). In practice of course poorer values are obtained, among other things owing to tolerances in the values and reflections of the balancing components along the section of line and in the termination of the line.

The most important reason for reflections along the line is the variations existing in the shunt capacitances of the loaded line sections because of lack of uniformity in the line properties and because of lack of uniform placing of the loaded line coils along the section of line.

Figure 3:
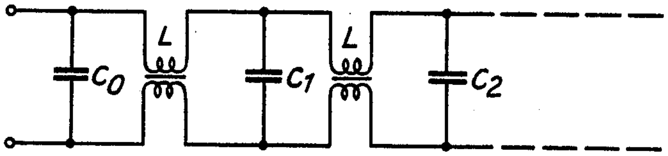

In FIG. 3 a loaded line is shown in which such variations exist. Thus the different loaded line sections have the shunt capacitances $C_0$, $C_1$, $C_2$, $C_3$ etc. The deviation in the shunt capacitance $C_0$ of the end section from the nominal value $C/2$ can of course easily be compensated in the balancing network by making $$C_T = C_0 - (1-m)C/2$$

Previously it is known to dimension the balancing network starting from a nominal value of C=average capacitance of the loaded line section. If the capacitances of the loaded line sections are statistically distributed around this value with a maximum deviation of ±2% it can be proved that the resulting reflection attenuation in the upper part of the transmitted frequency band according to the order of magnitude will be 25 db. Of course this also depends on the type of line and on the type of loading. This value that well coincides with what is usually achieved in practice on long lines with good termination is apparently considerably lower than the value attainable for a line without variations in capacitance. Furthermore, in practice, it often occurs with regard to the terrain, building activities and so on, that it is necessary to place the loaded line coils with care since greater deviations in capaciitance will arise. Thus when dimensioning the balancing network it is very important to pay regard as much as possible to the variations in capacitance.

The loaded line section capacitances $C_1$, $C_2$ etc. are as a rule known (at least as average values for a group of lines) either on the basis of measurements in factories and also on statements as to the length of the sections or on the basis of measurements carried out in connection with the cable installation. Supposing that the Hoyt-balance is determined on the basis of a $C$-value$=C_1$, the first reflection will arise in the crossing between those loaded line sections to which $C_1$ and $C_2$, respectively, belong.

The reflection current is approximately proportional to the capacitance difference $C_2-C_1$ and to the frequency At the frequency $f_1/\sqrt{2}$ said reflection current, measured from the input to the loaded line section indicated by $C_1$, has been subjected to the phase shift $\pi$ radians and to the attenuation $2a$ neper where $a$ is the line attenuation at said frequency counted per loaded line section. The reflection thus acts as a virtual contribution to $C_1$ with the value $$(C_2-C_1)\cdot e^{-2a-j\pi} = -(C_2-C_1)\cdot e^{-2a}$$

In the same way the reflection from the transition from $C_2$ to $C_3$ acts as an additional contribution to $C_2$ with the value $-(C_3-C_2)\cdot e^{-2a}$ or as an additional contribution to $C_1$ with the value $(C_3-C_2)\cdot e^{-4a}$. The virtual value of $C_1$ thus will be $$\begin{aligned} C &= C_1-(C_2-C_1)\cdot e^{-2a}+(C_3-C_2)\cdot e^{-4a} \\ &\quad -(C_4-C_3)\cdot e^{-6a}+(C_5-C_4)\cdot e^{-8a}- \dots \\ &= (1+e^{-2a})(C_1-C_2)\cdot e^{-2a}+C_3\cdot e^{-4a}- \dots \end{aligned}$$

Thus this C-value should be used as a basic value when dimensioning the Hoyt-balance in order to get the best line balancing at the frequency $f_1/\sqrt{2}$.

The frequency $f_1/\sqrt{2}$, i.e. about 71% of the limit frequency, has been selected for the calculations referred to with regard to the fact that these then become particularly simple. However this frequency is approximately the highest that can be amplified in practice with full compensation for the increase of the attenuation of the line with the frequency. For this reason higher frequencies than $f_1/\sqrt{2}$ at which the reflections because of inequalities in capacitance would be theoretically stronger, have only a small influence on the working properties of the amplified connections from the point of view of echo and stability.

At lower frequencies the reflections are of course weaker.

The series indicated above can be interrupted when the attenuation of the echo currents has become so great that the normal differences in capacitance between adjacent loaded line sections no longer gives a significant additional contribution to C. For example differences in capacitance of 4% give contributions to C that are less than 0.5% when the attenuation in the one direction to the reflection point is at least 9 db. For the sake of simplicity the difference in capacitance at this point and at points located beyond this point can be set =0 and the formula $$\begin{aligned} C &= (1+e^{-2a})(C_1-C_2e^{-2a}+C_3e^{-4a}- \dots \\ &\quad +C_n(-1)^{n-1}e^{-(n-1)2a}+C_{n+1}(-1)^n e^{-n2a}) \end{aligned}$$

where $n$ is an integer, will be obtained if $C_{n+1}-C_n$ is the difference in capacitance that is last retained. Here the requirement of accuracy $$|C_{v+1}-C_v|e^{-2va} \ll C_1$$

where $v$ is an integer, ought to be fulfilled for all $v>n$ but even though the series is interrupted earlier, an improvement will be achieved compared with whether the balance is calculated with a starting point from $C_1$ or from the average loaded line section capacitance. This is seen if one considers the differences in capacitance included in the series as determined and the other differences as accidental.

If $2a$ is a small number ($<<1$) the following further simplification can be made, if a moderate number of terms are used:

$$C = 2C_1-2C_2+2C_3- \dots +2C_n(-1)^{n-1}+C_{n-1}(-1)^n$$

It appears from what is described above that the balancing network now suggested gives a much better result than earlier known networks.

I claim:

1. A balancing network for balancing, within a given band pass, a loaded line having a plurality of line sections each having a distributed capacitance and being provided with a loading coil having an inductance L wherein the line extends from a starting section which is a half loaded line section, via a plurality of full loaded line sections to a termination, said network comprising a series impedance, said series impedance comprising an inductor having an inductance $L_1$ and a capacitor having a capacitance $C_L$, a shunt capacitor having a capacitance $C_T$ connected to one side of said series impedance, and shunt resistor having a resistance R connected to the other side of said series impedance, where $$\begin{aligned} &C_L = (1-m^2)C/2m, \\ &C_T = mC/2, \\ &L_1 = mL/2, \\ &R = \sqrt{L/C}, \\ &m = \text{a fraction}, \\ &C = (1+e^{-2a})[C_1-C_2e^{-2a}+C_3e^{-4a}- \dots \\ &\quad +C_n(-1)^{n-1}e^{-2(n-1)a}++C_{n+1}(-1)^n e^{-2na}] \end{aligned}$$

where $C_1$, $C_2$, $C_3$ . . . $C_n$, $C_{n+1}$ are the actual distributed capacitances of the full loaded line sections in the order of their position from said starting section to said termination, $a$ is the image attenuation constant per loaded line section at the upper 3 db frequency of the pass band and $n$ is an integer.

2. A balancing network for balancing, within a given band pass, a loaded line having a plurality of line sections, each having a distributed capacitance and being provided with a loading coil having an inductance L wherein the line extends from a starting section which is a half loaded line section, via a plurality of full loaded line sections to a termination, said network comprising a series impedance, said series impedance comprising an inductor having an inductance $L_1$ and a capacitor having a capacitance $C_L$, a shunt capacitor having a capacitance $C_T$ connected to one side of said series impedance, and shunt resistor having a resistance R connected to the other side of said series impedance, where $C_L=(1-m^2)C/2m$,
$C_T=mC/2$,
$L_1=mL/2$,
$R=\sqrt{L/C}$,
$m$=a fraction,
$C=2C_1-2C_2+2C_3- \dots +2C_n(-1)^{n-1}+C_{n+1}(-1)^n$, where $C_1$, $C_2$, $C_3$ . . . $C_n$, $C_{n+1}$ are the actual distributed capacitances of the full-line sections in order of their position from said starting section to said termination, and $n$ is an integer.

References Cited

UNITED STATES PATENTS 1,322,634 11/1919 Shaw.

FOREIGN PATENTS 213,029 12/1966 Sweden.

HERMAN KARL SAALBACH, Primary Examiner

PAUL L. GENSLER, Assistant Examiner

U.S. Cl. X.R.

333—28, 33